J. M. HENDRIX.
TRAP.
APPLICATION FILED MAR. 10, 1908.
910,000. Patented Jan. 19, 1909.
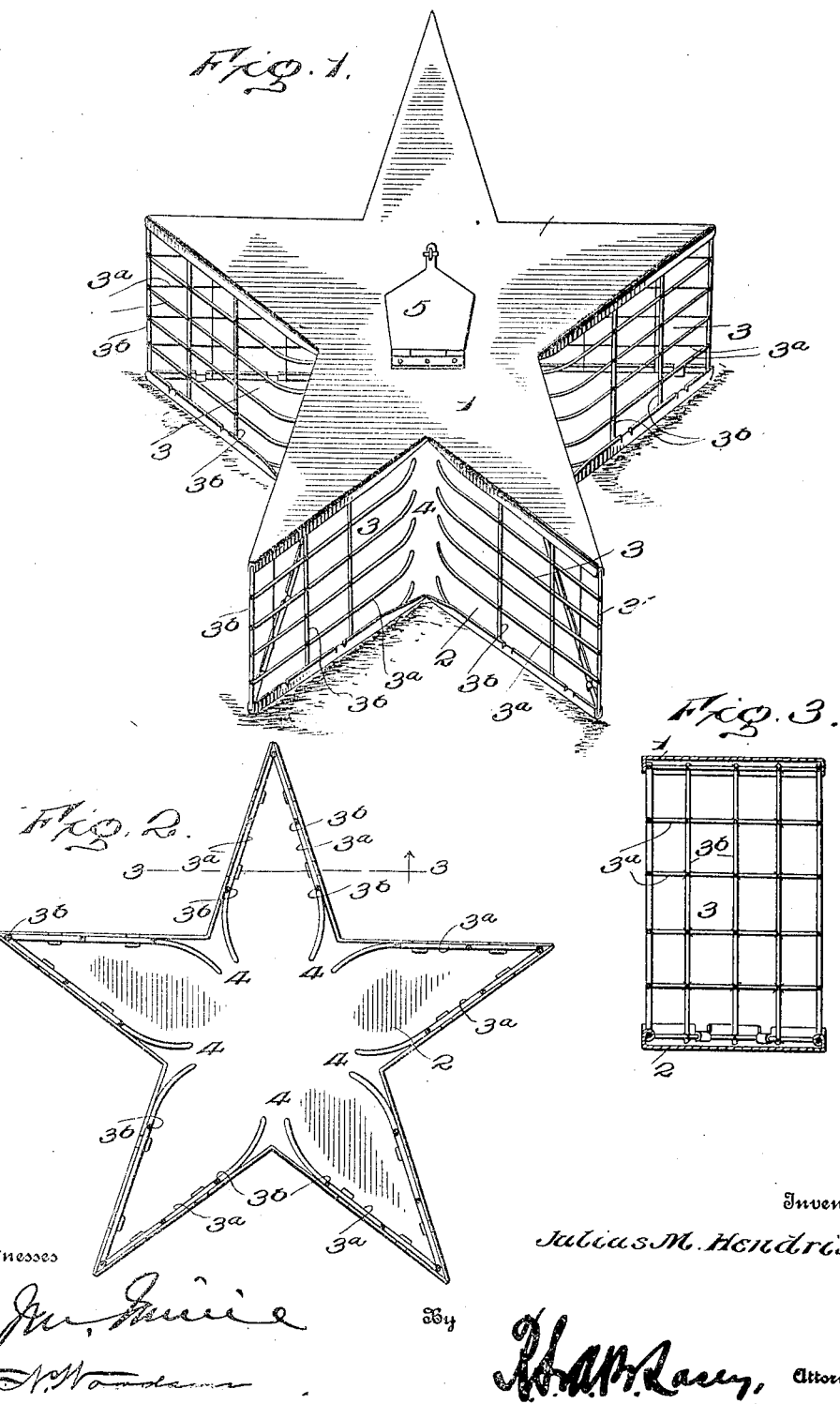

UNITED STATES PATENT OFFICE.

JULIUS M. HENDRIX, OF LEWISVILLE, TEXAS.

TRAP.

No. 910,000.  Specification of Letters Patent.  Patented Jan. 19, 1909.

Application filed March 10, 1908. Serial No. 420,268.

*To all whom it may concern:*

Be it known that I, JULIUS M. HENDRIX, citizen of the United States, residing at Lewisville, in the county of Denton and State of Texas, have invented certain new and useful Improvements in Traps, of which the following is a specification.

The present invention relates to an improved fish and animal trap embodying a novel construction in which the trap proper is formed with lateral arms which serve the double function of aiding in retaining the animals within the trap and of forming a guide leading to the entrance of the trap.

The object of the invention is to provide a simple and inexpensive trap which can be made in various sizes and utilized in connection with all kinds of animals.

For a full description of the invention and the merits thereof and also to acquire a knowledge of the details of construction and the means for effecting the result, reference is to be had to the following description and accompanying drawings, in which:

Figure 1 is a perspective view of a trap embodying the invention. Fig. 2 is a horizontal sectional view through the same. Fig. 3 is a vertical sectional view on the line 3—3 of Fig. 2.

Corresponding and like parts are referred to in the following description and indicated in all the views of the drawings by the same reference characters.

Broadly speaking the invention comprises a trap in which the body portion is formed with a plurality of lateral arms inclosed by reëntrant sides, the said reëntrant sides converging inwardly toward each other and being provided at their inner ends with spring arms which coöperate to permit an animal to enter the trap but prevent his exit therefrom. The trap has a flattened formation and comprises a top plate 1 and a bottom plate 2 which are spaced from each other and are similar in shape. These plates are formed with radial and pointed projections and in the present instance have the shape of stars, the edges of the two plates being connected by the sides 3, the sides upon adjacent arms of the trap converging inwardly toward each other and coöperating at their inner ends to form an entrance to the trap. It will thus be apparent that the arms of the trap which are located between the pointed projections of the plates 1 and 2 serve the double function of forming a space to retain the animals within the trap and also of constituting guides for leading the animals to the entrance of the trap. The sides 3 are preferably formed of wire mesh and in the present instance the mesh comprises the longitudinal strands 3ª and the transverse strands 3ᵇ, the former being formed of spring material and terminating at their inner ends in spring extensions 4 having their extremities curved inwardly. These spring arms or extensions 4 can be readily sprung apart by an animal when entering the trap, but are forced together when an animal attempts to leave the trap. It will also be readily apparent that this form of trap is advantageous since after the animal has entered the trap it will naturally attempt to work its escape through one of the lateral arms between the points of the top and bottom plates, which lateral arms are the strongest portion of the trap. Any suitable means may be provided for removing the animals from the trap, and in the present instance the top plate 1 is provided with a central opening normally closed by a door 5.

Having thus described the invention, what is claimed as new is:

The herein-described trap comprising spaced upper and lower plates which have a substantially star-shaped formation and are formed with corresponding pointed arms, and reëntrant sides connecting the edges of the corresponding arms, the sides of adjacent arms converging inwardly toward each other and being formed of wire mesh comprising transverse strands, and intersecting longitudinal strands, the longitudinal strands terminating at their inner ends in spring extensions which are curved inwardly and are adapted to spring apart to permit the entrance of an animal into the trap, but to come together to prevent the animal from leaving the trap.

In testimony whereof I affix my signature in presence of two witnesses.

JULIUS M. HENDRIX. [L. S.]

Witnesses:
 WILLIAM G. SAVAGE,
 J. GANO BRUMLEY.